US012350946B2

(12) United States Patent
Hanzawa et al.

(10) Patent No.: US 12,350,946 B2
(45) Date of Patent: Jul. 8, 2025

(54) PRINTING APPARATUS

(71) Applicant: CANON KABUSHIKI KAISHA, Tokyo (JP)

(72) Inventors: Yu Hanzawa, Kanagawa (JP); Yasuhito Tsubakimoto, Tokyo (JP); Toshimitsu Takahashi, Kanagawa (JP); Toru Yada, Kanagawa (JP); Takao Kawai, Tokyo (JP); Hiroki Akiyama, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 90 days.

(21) Appl. No.: 18/165,994

(22) Filed: Feb. 8, 2023

(65) Prior Publication Data

US 2023/0256757 A1 Aug. 17, 2023

(30) Foreign Application Priority Data

Feb. 16, 2022 (JP) ................................. 2022-022110

(51) Int. Cl.
*B41J 29/02* (2006.01)
*B41J 2/14* (2006.01)
*B41J 2/165* (2006.01)
*B41J 11/00* (2006.01)

(52) U.S. Cl.
CPC ................. *B41J 29/02* (2013.01); *B41J 2/14* (2013.01); *B41J 11/007* (2013.01); *B41J 2002/16582* (2013.01)

(58) Field of Classification Search
CPC ... B41J 29/377; B41J 29/02; B41J 2/14; B41J 2002/16582; B41J 11/007
See application file for complete search history.

(56) References Cited

U.S. PATENT DOCUMENTS

| | | | | |
|---|---|---|---|---|
| 8,757,794 | B2 | 6/2014 | Takemura | |
| 9,016,852 | B2 | 4/2015 | Takemura | |
| 9,193,152 | B2 * | 11/2015 | Miller | B41J 2/01 |
| 2019/0240981 | A1 * | 8/2019 | Tachibana | B41J 2/1714 |
| 2021/0237467 | A1 | 8/2021 | Kemma et al. | |
| 2022/0040986 | A1 * | 2/2022 | Kobayashi | B41J 29/38 |

FOREIGN PATENT DOCUMENTS

| | | |
|---|---|---|
| JP | 2012-045861 A | 3/2012 |
| JP | 2021-123103 A | 8/2021 |

* cited by examiner

*Primary Examiner* — Thinh H Nguyen
(74) *Attorney, Agent, or Firm* — Venable LLP

(57) ABSTRACT

The object of the present disclosure is to implement capturing of mist. One embodiment of the present invention is a printing apparatus including: a carriage, on which a print head that ejects a liquid is mounted, configured to reciprocate within a predetermined range in a second direction intersecting with a first direction; a partition member configured to partition an inside of the casing in the first direction into a first space in which the carriage reciprocates and a second space in which the carriage does not reciprocate; a first communication unit provided within the predetermined range in the second direction and configured to cause the first space and the second space to communicate with each other; and a second communication unit provided outside the first communication unit in the second direction and configured to cause the first space and the second space to communicate with each other.

18 Claims, 19 Drawing Sheets

PRINTING APPARATUS

BACKGROUND

Field

The present disclosure relates to a printing apparatus.

Description of the Related Art

There are some conventional image printing apparatuses that form an image by ejecting minute ink droplets from a print head and causing the ink droplets to land onto a printing medium. The ink droplet ejected from the print head splits into a main droplet that lands onto paper and forms an image and minute ink mist separated from the main droplet, and therefore, there is such a problem that the ink mist floats and sticks to parts within the apparatus, thereby staining the inside of the apparatus and reducing the durability of the image printing apparatus.

In order to solve this problem, the apparatus disclosed in Japanese Patent Laid-Open No. 2012-45861 guides air into an ink mist removal mechanism by using an electric fan and captures the ink mist by using a capturing unit configured to capture ink mist within the removal mechanism.

Further, the apparatus disclosed in Japanese Patent Laid-Open No. 2021-123103 guides air into a suction duct by using an electric fan and discharges the air having collected ink mist through a collection filter from a discharge duct.

SUMMARY

However, the apparatuses of the patent documents described above have such a problem that a space for arranging the fan is necessary because the fan is necessary as the ink mist capturing unit. Further, there is also such a problem in terms of power consumption of the fan, the occurrence of noise and the like.

Consequently, in view of the above-described problems, an object of the present disclosure is to implement capturing of mist.

Means for Solving the Problem

One embodiment of the present invention is a printing apparatus including: a casing; a conveyance unit configured to convey a printing medium in a first direction; a carriage, on which a print head that ejects a liquid is mounted, configured to reciprocate within a predetermined range in a second direction intersecting with the first direction; a partition member configured to partition an inside of the casing in the first direction into a first space in which the carriage reciprocates and a second space in which the carriage does not reciprocate; a first communication unit provided within the predetermined range in the second direction and configured to cause the first space and the second space to communicate with each other; and a second communication unit provided outside the first communication unit in the second direction and configured to cause the first space and the second space to communicate with each other.

Further features of the present disclosure will become apparent from the following description of exemplary embodiments with reference to the attached drawings.

DESCRIPTION OF THE EMBODIMENTS

In the following, with reference to the attached drawings, preferred embodiments of the present disclosure are explained in detail. Throughout each drawing, the same symbol indicates the same or corresponding portion. Features explained below are not intended to limit the present disclosure according to claims and all combinations of the features are not necessarily indispensable to the solution of the present disclosure.

First Embodiment

About Configuration of Image Printing Apparatus

Figure 1:
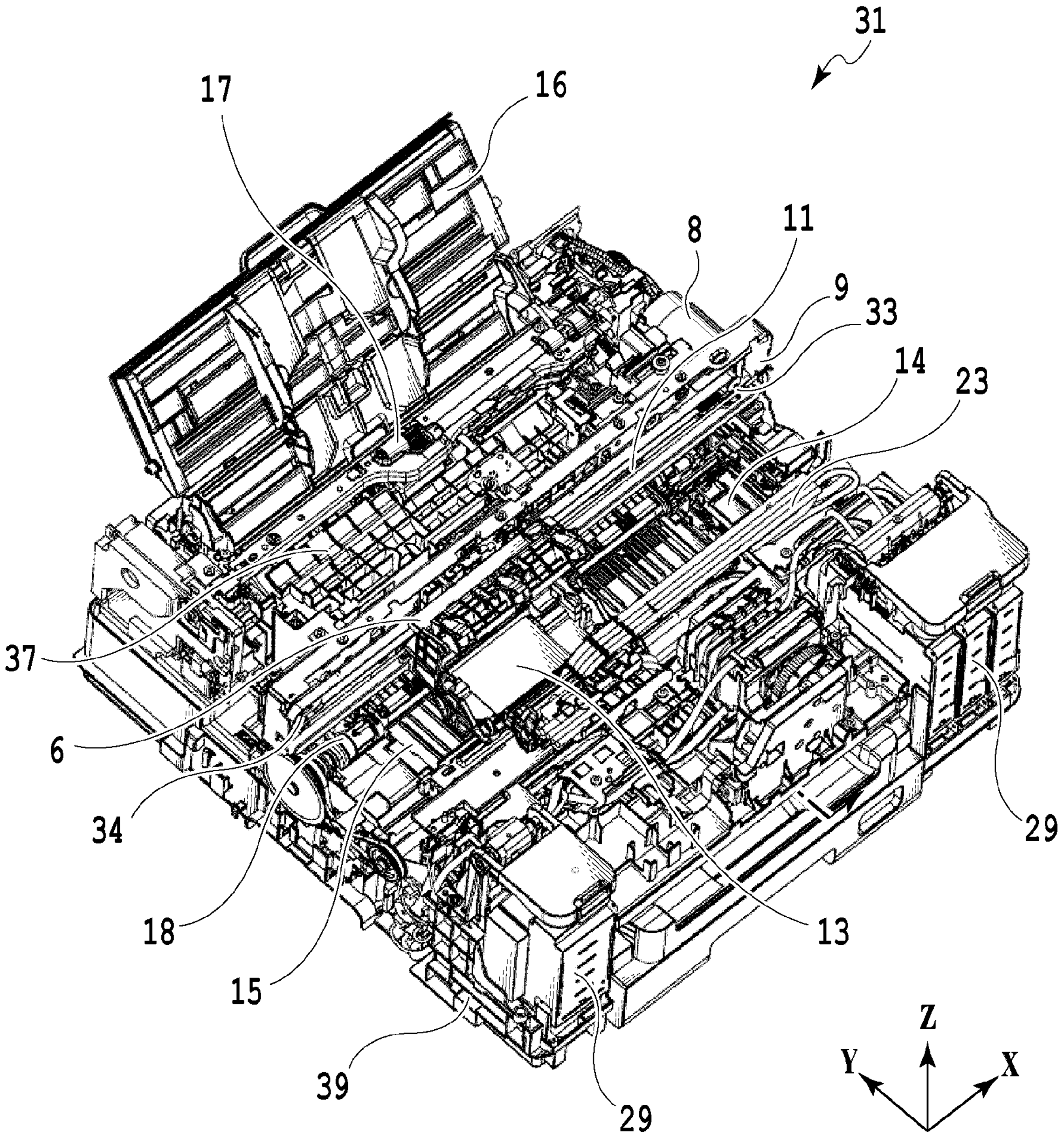
FIG. 1 is a perspective diagram showing an internal structure of an ink jet printing apparatus.
Figure 2:
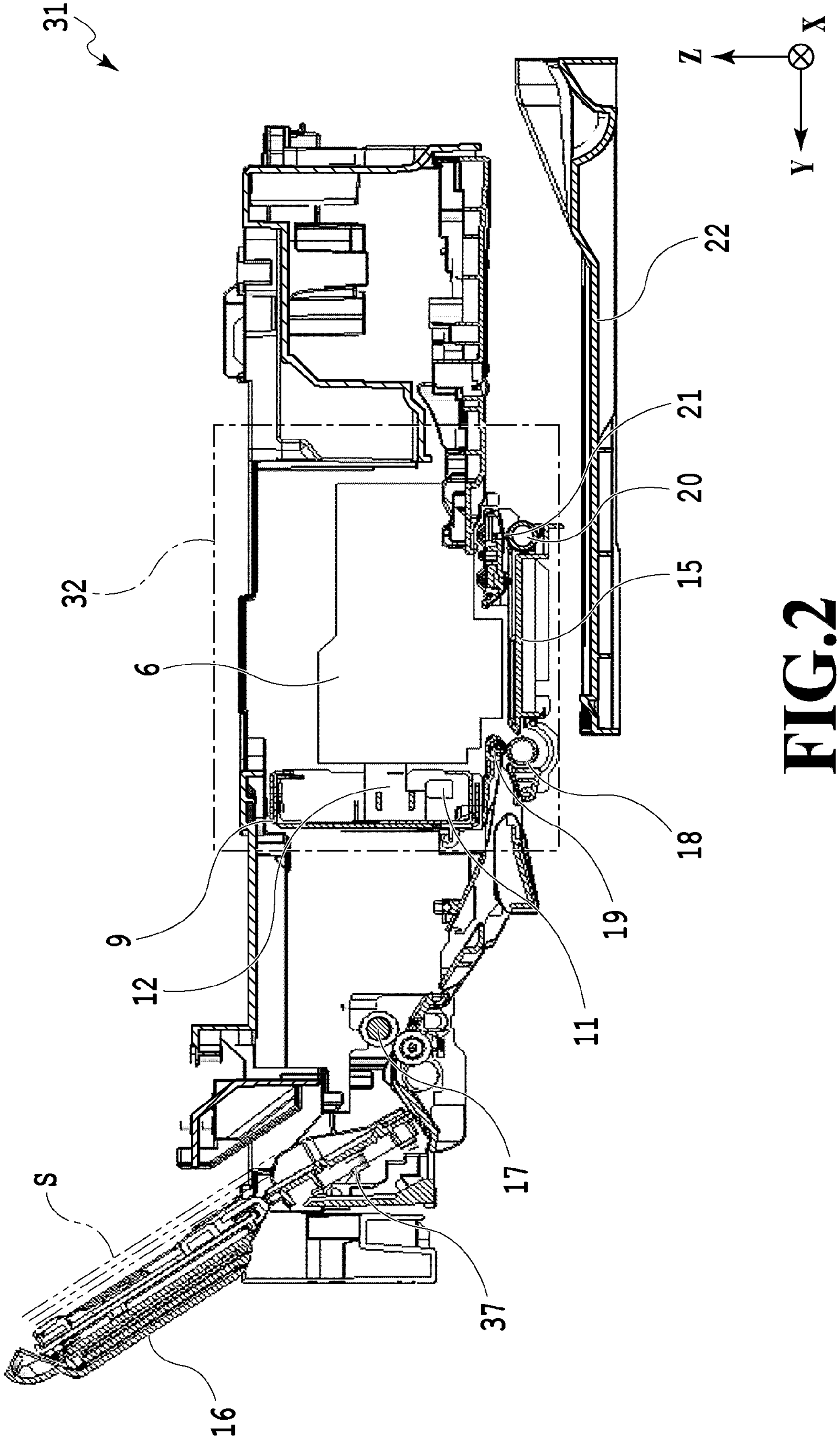
FIG. 2 is a cross-sectional diagram at the center of the ink jet printing apparatus.
Figure 3:
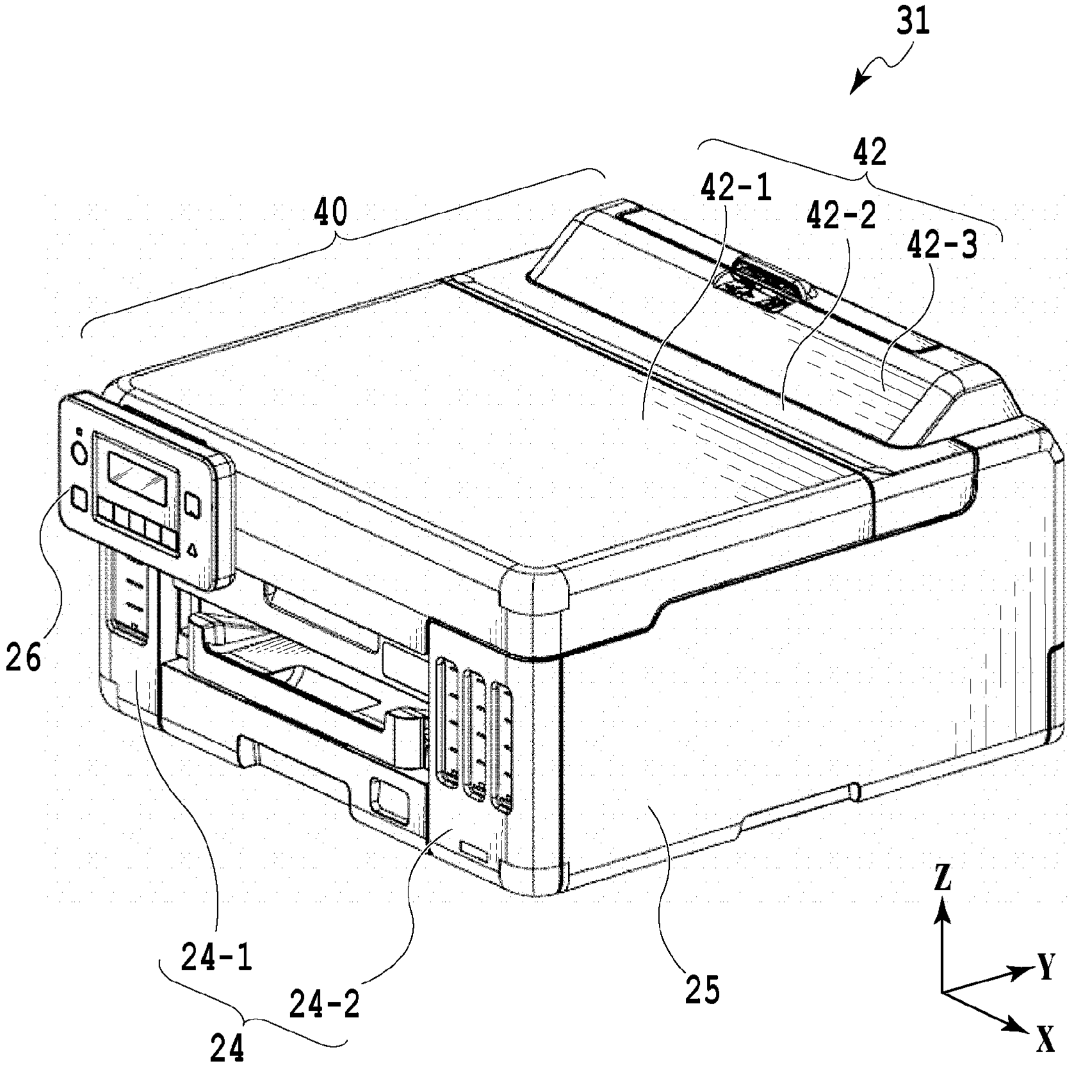
FIG. 3 is a perspective diagram showing an outer appearance of the ink jet printing apparatus.
Figure 4:
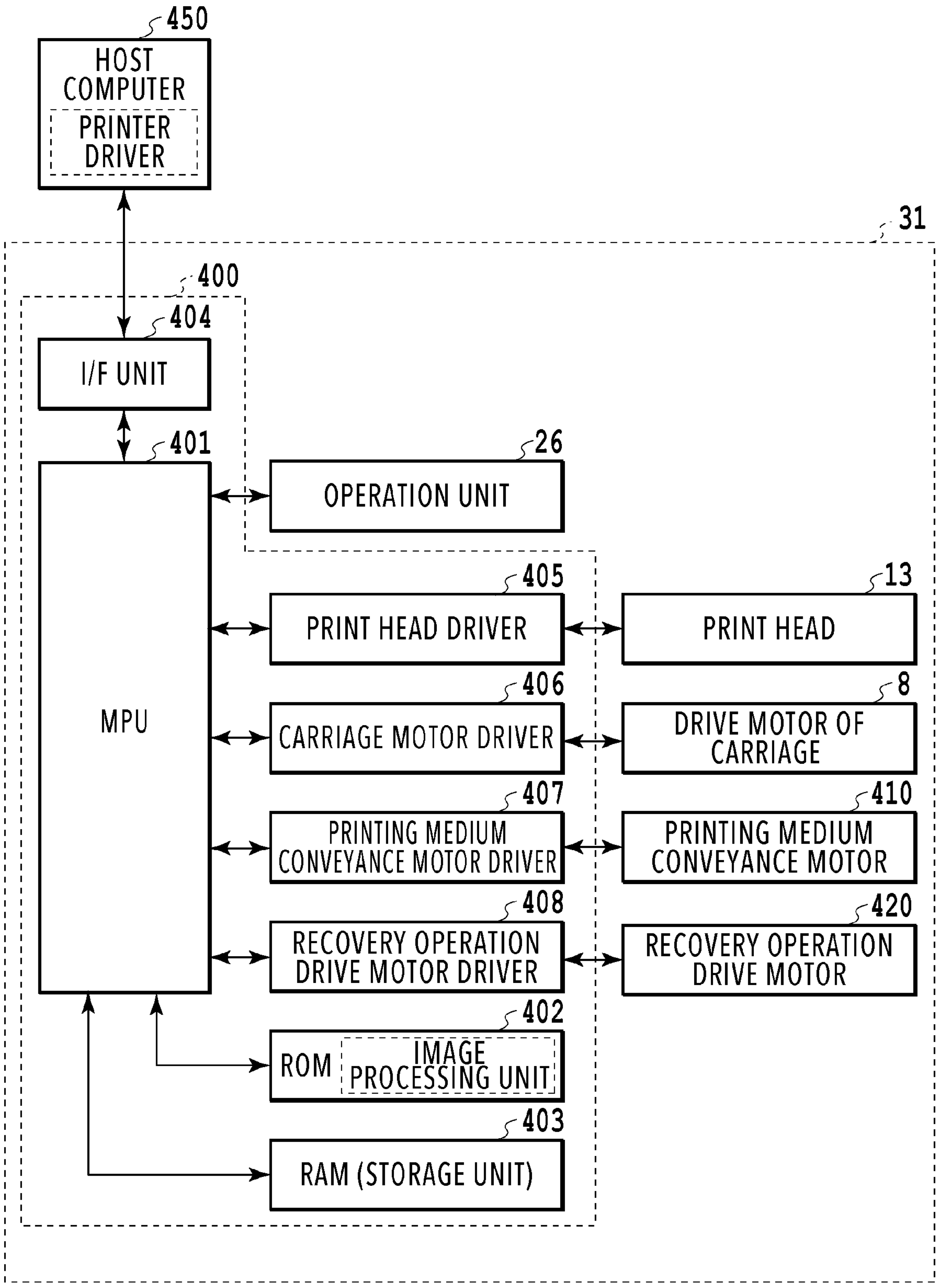
FIG. 4 is a block diagram of the ink jet printing apparatus.

In the following, the configuration of the image printing apparatus according to the present embodiment is explained by using FIG. 1 to FIG. 4. FIG. 1 is a perspective diagram of an image printing apparatus 31 according to the present embodiment, showing the internal structure in a case where external parts are removed from the image printing apparatus 31. FIG. 2 is a cross-section diagram obtained by cutting the image printing apparatus 31 at the center. FIG. 3 is a perspective diagram showing the outer appearance of the image printing apparatus 31. FIG. 4 is a block diagram showing the configuration relating to the control of the image printing apparatus 31. In each of FIG. 1 to FIG. 3, the common coordinate axes are set. Among these coordinate axes, an X-axis represents the movement direction of a carriage 6, a Y-axis represents the conveyance direction of a printing medium S (for example, paper) in a printing unit 32 (−Y-direction indicates the downstream side), and a Z-axis represents the height direction and it is assumed that the same coordinate axes are set in the other drawings in principle.

As shown in FIG. 3, the image printing apparatus 31 has an operation unit 26 and it is possible for a user to designate the paper size, switch between online and offline, input a command and so on by using various switches and the like installed in the operation unit. As shown in FIG. 2, a feeding tray 16 can be drawn out and is provided with a feeding pressure plate 37 on which a plurality of the printing media S can be stacked and a separation roller 17 separates the printing media S stacked on the feeding pressure plate 37 of the feeding tray 16 one by one and feeds it to the conveyance path. The printing medium S is sent to between a conveyance roller 18 and a pinch roller 19 by the separation roller 17 and by the conveyance roller 18 rotating in the clockwise direction in FIG. 2, the printing medium S is conveyed on a platen 15 and conveyed up to the printing unit 32. As shown in FIG. 1, in the printing unit 32, a print head 13 configuring a printing unit is provided inside the carriage 6. The print head 13 is an ink jet head in which a predetermined number of ink ejection holes, so-called nozzles, is arranged. While scanning in the direction parallel to the printing surface of the printing medium S in FIG. 2, this print head 13 performs printing by ejecting ink droplets to the printing surface of the printing medium S from the nozzles in accordance with the print data. The print head 13 forms an image on the printing medium S while alternately repeating the printing operation and the conveyance operation by a predetermined amount of the printing medium S by the conveyance roller 18. Together with the image forming operation, the printing medium S is nipped by a discharge roller 20 and a discharge spur 21 provided on the discharge side of the scan area of the print head 13 in the conveyance path of the printing medium S and the printing medium S is discharged onto a discharge tray 22 by the rotation of the discharge roller 20.

The image printing apparatus 31 comprises a control unit and the control unit is a controller that performs various kinds of control of the entire image printing apparatus 31 and comprises a CPU, a memory, and various I/O interfaces. The control unit may be one incorporated within the casing or an external one. In a case of the external one, a computer connected to the image printing apparatus, in which control software is incorporated, may be taken as the control unit.

FIG. 4 is a block diagram showing a control unit 400 as an example of the control unit comprised by the image printing apparatus 31. As shown in FIG. 4, the image printing apparatus 31 connected to an external host computer 450 has the control unit 400, the print head 13, a drive motor 8 of a carriage, a printing medium conveyance motor 410, and a recovery operation drive motor 420. The control unit 400 has an MPU 401, a ROM 402, a RAM 103, an I/F unit 404, a print head driver 405, a carriage motor driver 406, a printing medium conveyance motor driver 407, and a recovery operation drive motor driver 408.

The MPU 401 implements each function, such as the image processing function, in the image printing apparatus 31 by controlling the entire image printing apparatus 31 by using computer programs and data stored in the ROM 402 or the RAM 403. It may also be possible for the image printing apparatus 31 to have one piece or a plurality of pieces of dedicated hardware different from the MPU 401 and the dedicated hardware may perform at least part of the processing that is performed by the MPU 401. As an example of dedicated hardware, there are an ASIC (Application Specific Integrated Circuit), an FPGA (Field Programmable Gate Array), a DSP (Digital Signal Processor) and the like. The ROM 402 stores programs, data and the like that do not need to be changed. The RAM 403 temporarily stores programs and data supplied from the ROM 402, data supplied from the outside via the I/F unit 404, and the like.

The operation unit 26 includes, for example, a liquid crystal display, an LED and the like and displays a GUI (Graphical User Interface) for a user to operate the image printing apparatus 31, and the like. Further, the operation unit 26 includes, for example, a keyboard, a mouse, a joystick, a touch panel and the like and inputs various instructions to the MPU 401 upon receipt of the operation by a user. The MPU 401 operates as a display control unit and an operation control unit configured to control the operation unit 26.

The I/F unit 404 is used for communication with the host computer 450, which is the external device of the image printing apparatus 31. For example, in a case where the image printing apparatus 31 is connected with an external device by wire, a communication cable is connected to the I/F unit 404. In a case where the image printing apparatus 31 has a function to wirelessly communicate with an external device, the I/F unit 404 comprises an antenna.

<About Printing Unit>

In the following, the printing unit 32 is explained. The printing unit 32 has the print head 13, the carriage 6 that mounts the print head 13, the drive motor 8 of the carriage 6, and the platen 15. The print head 13 integrally has a nozzle unit configured to eject ink (not shown schematically). An ink tank 29 is installed at a position distant from the printing unit 32 within the image printing apparatus 31 and has a structure in which ink is supplied to the nozzle unit of the print head 13 via a tube 23. A carriage rail 11 retains the carriage 6 and at the same time is comprised as a movement guide material. The carriage 6 is configured to move along the carriage rail 11, that is, move in a +X-direction (called backward direction) or a −X-direction (called forward direction). In the present specification, the +X-direction and the −X-direction in which the carriage 6 moves are together called "main scanning direction", "reciprocating direction of carriage" and the like. In the vicinity of the top of the carriage 11, an encoder code strip 12 is comprised in parallel to the carriage rail 11. On the substrate within the carriage unit, an encoder (not shown schematically) for reading an encoder code strip is comprised. The encoder functions as a position confirmation unit. By the encoder reading, as the carriage 6 moves, marks formed at an equal pitch on the encoder code strip 12 as a positioning guide member and detecting the carriage 6, position information on the carriage 6 is obtained. At both end portions of a chassis 9, there are bent and raised shapes so that it is possible to retain and fix the encoder code strip 12 and the encoder code strip 12 is retained in parallel to the carriage rail. The carriage rail 11 is fixed so as to be parallel to the chassis 9. Along the carriage rail 11, the carriage 6 reciprocates in the main scanning direction. At that time, from the nozzle unit of the print head 13 attached to the carriage 6 in accordance with the position in the main scanning direction in the encoder code strip 12, ink is ejected and printing is performed.

Figure 10:
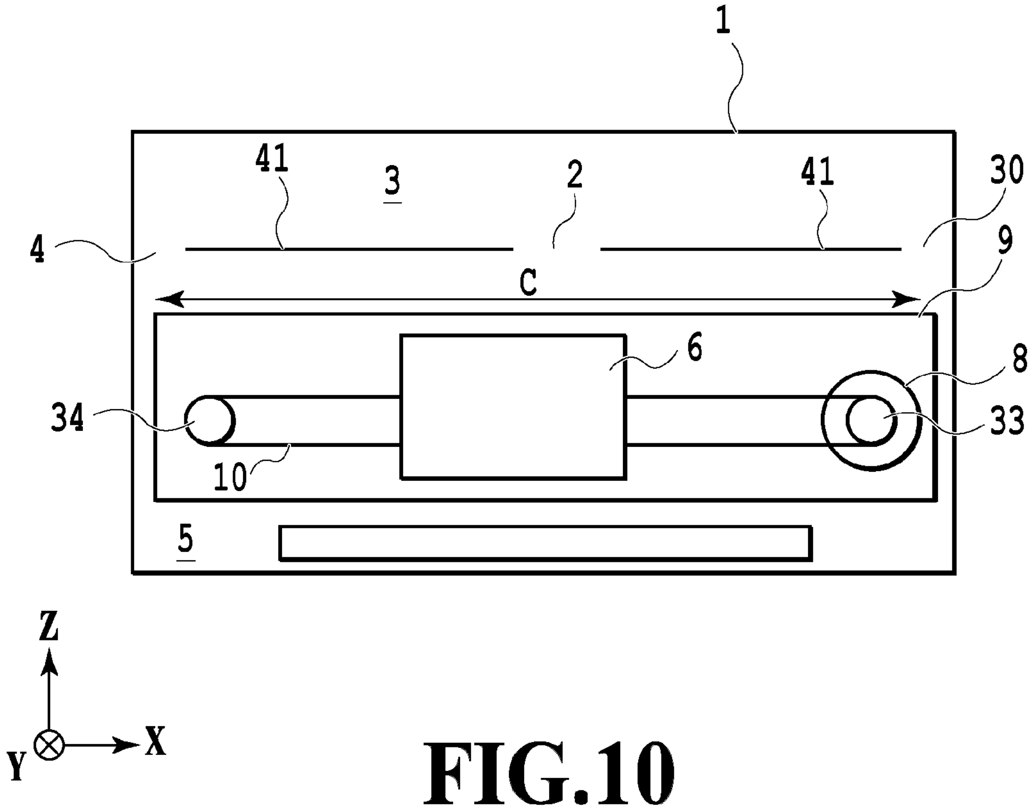
FIG. 10 is a schematic diagram showing a drive mechanism of the carriage.

The drive mechanism of the carriage 6 and the printing method are explained by using FIG. 10. A timing belt 10 is stretched by a motor pulley 33 of the drive motor 8 and an idler pulley 34. The timing belt 10 has a portion parallel to the carriage rail 11 and a transmission mechanism is provided, which converts the rotation of the drive motor 8 into a linear motion and causes the carriage 6 to move straight in the main scanning direction by part of the parallel portion and the carriage 6 being connected. The carriage 6 and the chassis 9 each have an abutting portion at each end portion and it is possible for the carriage 6 to move straight within a predetermined movement range thereof. Printing is performed by ink being ejected from the print head 13 toward the printing medium S. The image printing apparatus 31 of the present embodiment forms a two-dimensional image on the printing medium S by alternately performing the conveyance in the −Y-direction in FIG. 1, in which the printing medium S is conveyed, and the reciprocating movement in the main scanning direction of the carriage 6. In the present specification, the −Y-direction (called forward direction) in which the printing medium S is conveyed and the +Y-direction (called reverse direction) are together called "sub scanning direction" (meaning direction that intersects with the main scanning direction).

As shown in FIG. 1, at one end (in FIG. 1, the right end of the apparatus) of the main body of the image printing apparatus 31, a maintenance unit 14 configured to perform maintenance processing of the print head 13 is comprised. Specifically, the maintenance processing refers to wiping processing to wipe off the nozzle surface of the print head 13 with a wiper, suction processing to recover from clogging by sucking ink to the outside from the nozzle, and preliminary ejection processing to cause ink to be ejected from all the nozzles. The preliminary ejection processing is performed before starting printing on the printing medium S. During printing on the printing medium S, printing is not necessarily performed by always using all the nozzles, and therefore, there is a possibility that the nozzle that is not used for printing dries and causes an ejection failure. Consequently, in order to prevent the nozzle from drying, preliminary ejection is performed periodically in order from the nozzle whose use frequency is the lowest in the vicinity of the maintenance unit 14 and thereby the ejection reliability of the nozzle is maintained. In the present specification, of the movement end portions of the carriage 6 that reciprocates, the end portion on the side on which the maintenance unit 14 exists is called "home side (standby position side) end portion". Further, the other side end portion, which is the opposite side of the home side, is called "away side end portion". The preliminary ejection is performed at the home side end portion and the away side end portion. In the present embodiment, the maintenance unit exists on the right side in a case where the maintenance unit is viewed from the front of the image printing apparatus, but the maintenance unit may exist on the left side.

<About Outer Casing of Image Printing Apparatus>

Next, the outer casing of the image printing apparatus 31 is explained by using FIG. 1 to FIG. 3 and FIG. 6. The printing unit 32 is installed on a bottom frame 39. In the discharge direction (on the front surface side of the image printing apparatus 31) of the printing medium S, a front cover 24 is installed. As shown in FIG. 3, the front cover 24 includes a first front cover 24-1 on the away side and a second front cover 24-2 on the home side.

On the surface on the opposite side of the front cover 24 (rear surface side of the image printing apparatus 31, rear side), a rear cover (not shown schematically) is installed. Similarly, on both side surfaces of the image printing apparatus 31, a home side side cover 25 and an away side side cover (not shown schematically) are installed. On the top, a rotatable access cover unit 40 supported pivotally in the rear of the image printing apparatus 31 is installed. The access cover unit 40 includes an access cover 42 that exhibits its outer appearance on an access cover base 41 the closest to the printing unit 32. By the access cover base 41 and the access cover 42, a space is configured inside thereof. To the access cover base 41, the operation unit 26 configured to enable the operation of the main body is attached. It may also be possible to have a connection unit configured to connect the operation unit 26 and the control unit within the access cover unit 40.

Figure 16:
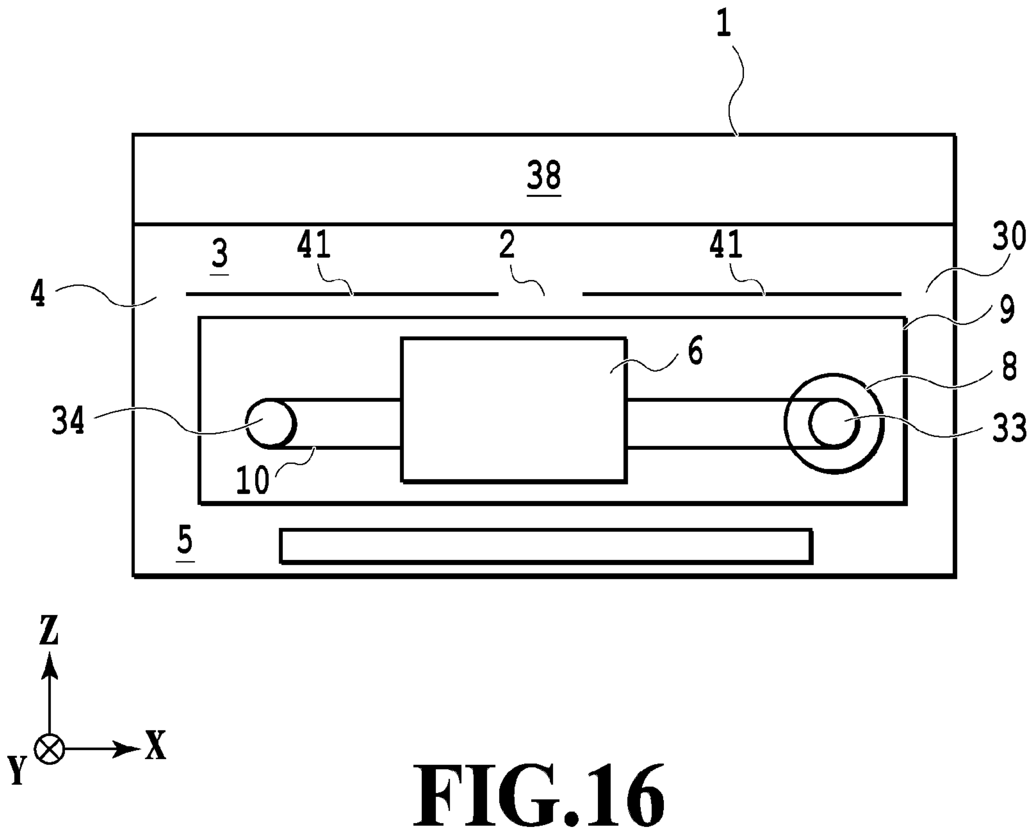
FIG. 16 is an image printing apparatus having a reading unit.

The number of parts constituting the surface of the outer appearance is not limited to the above. Further, it is also possible to apply the present embodiment to an image printing apparatus having a reading unit, in addition to the printing unit, as shown in FIG. 16. The image printing apparatus in FIG. 16 has a first space 5 on the side on which the carriage 6 exists, a second space 3 on the side on which the carriage 6 does not exist, which is located above the first space 5, and a third space 38 located above the second space 3. In this third space 38, the reading unit (not shown schematically) is arranged.

<About Ink Mist Removal Mechanism>

Figure 5A:
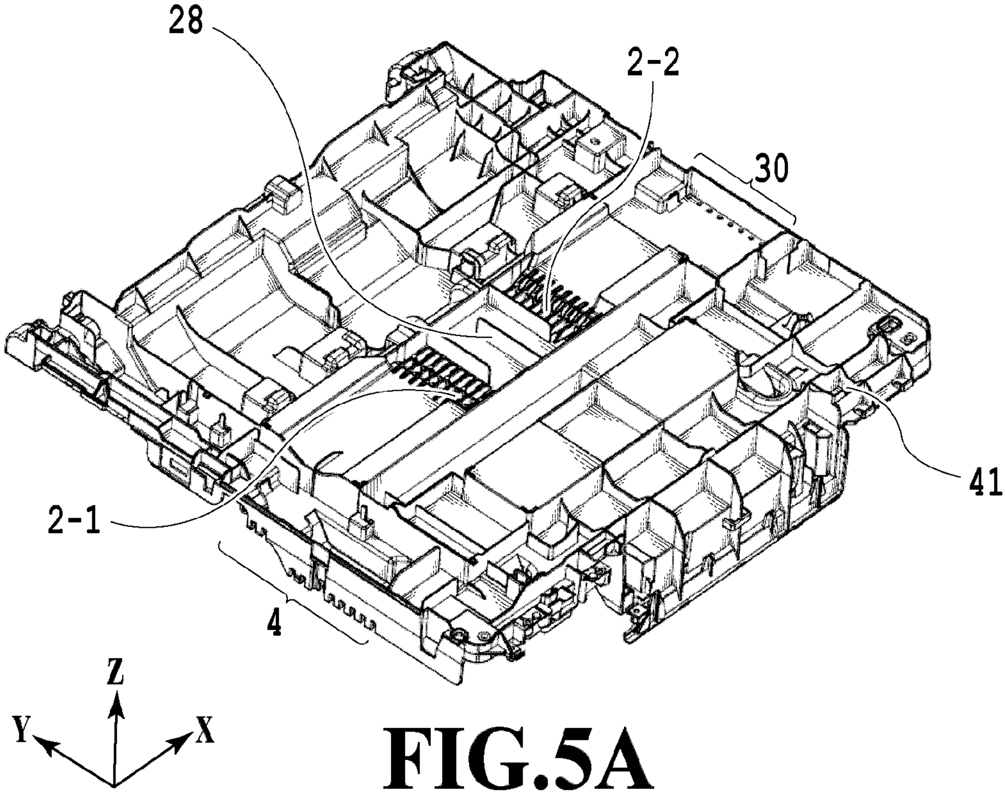
FIG. 5A and FIG. 5B are each a perspective diagram showing an access cover base configuring an air circulation flow path.
Figure 5B:
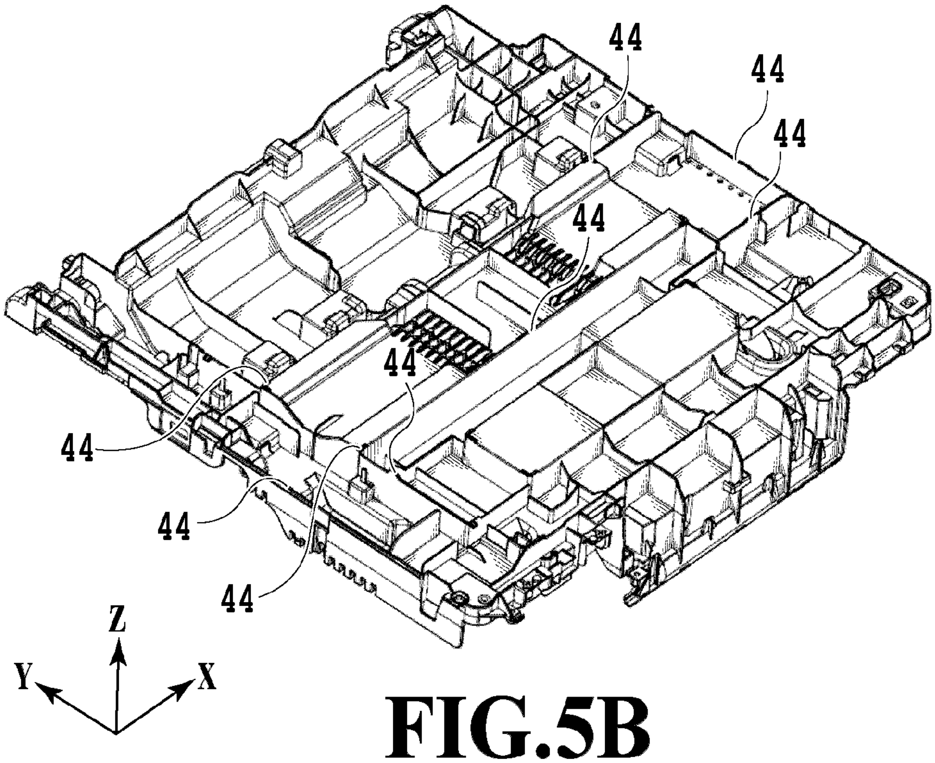
Figure 6:
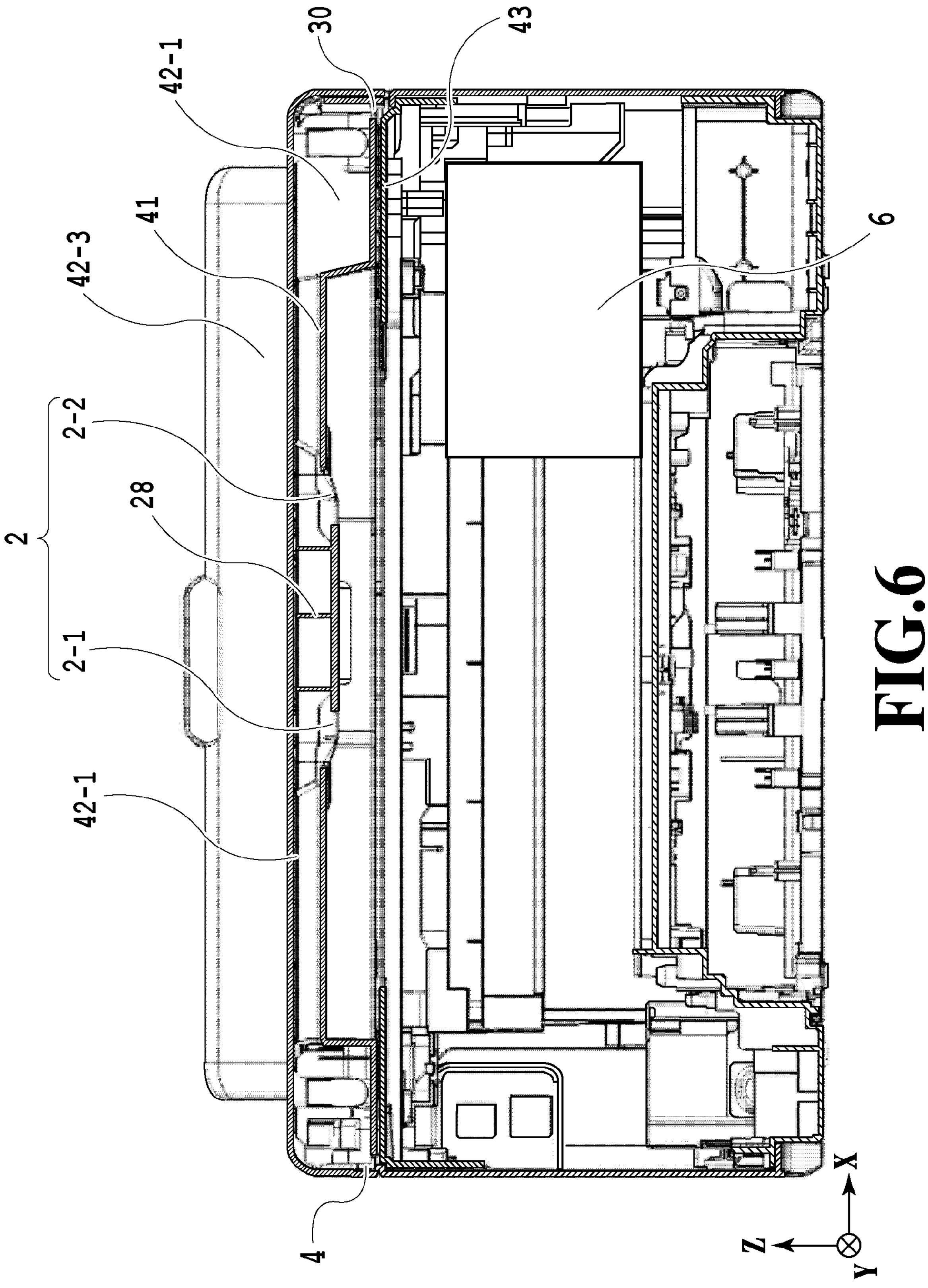
FIG. 6 is a cross-sectional diagram of the ink jet printing apparatus for explaining the air circulation flow path.

Next, an ink mist removal mechanism inside the image printing apparatus 31 is explained by using FIG. 5A to FIG. 11B and FIG. 15. FIG. 5A and FIG. 5B are each a perspective diagram showing the access cover base 41 configuring the ink mist removal mechanism in the image printing apparatus 31 of the present embodiment. FIG. 6 is a cross-sectional diagram showing the internal structure of the image printing apparatus 31, showing the internal structure of a flow path including the access cover base 41 and the access cover 42.

Figure 9A:
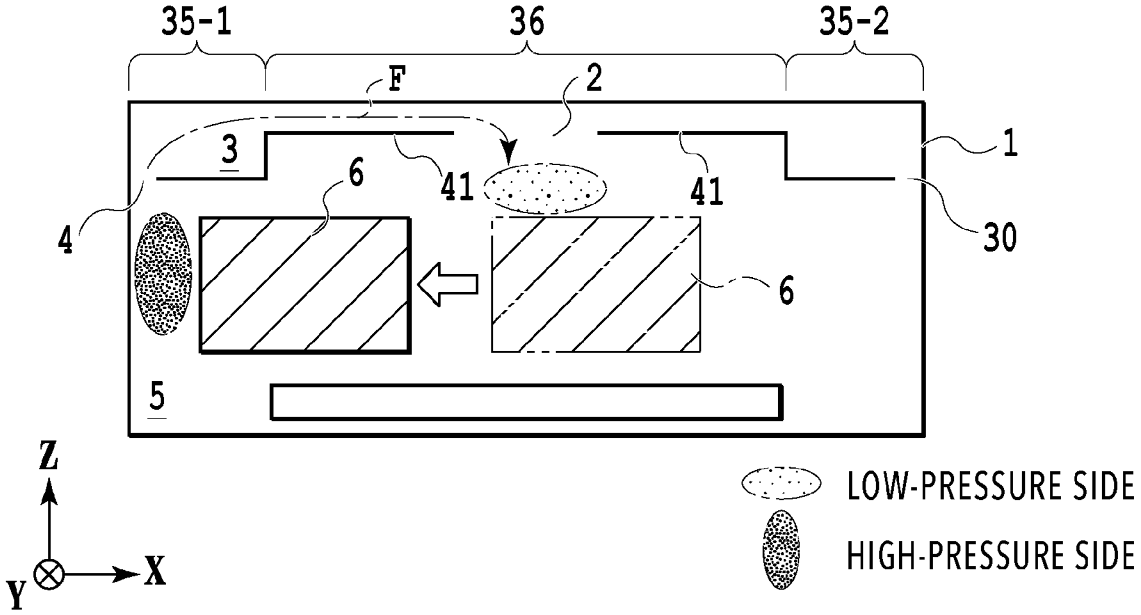
FIG. 9A and FIG. 9B are each a diagram showing a flow of air that occurs by movement of a carriage.

As shown in FIG. 5A and FIG. 6, the ink mist removal mechanism includes a communication unit (for example, communication hole) configured to cause spaces to communicate with each other and an air circulation flow path implemented by the access cover base 41 and the access cover 42. As shown in FIG. 9A, the air circulation flow path is provided in the second space 3 above (that is, in the +Z-direction) of the first space 5 in which the carriage 6 moves. Further, as shown in FIG. 9A and the like, the access cover base 41 functions as a wall (referred to as partitioning member) for partitioning the first space 5 and the second space 3 from each other. As shown in FIG. 5A, in the present embodiment, the access cover base 41 that functions as a partitioning member extends in the main scanning direction and in the sub scanning direction.

Figure 7:
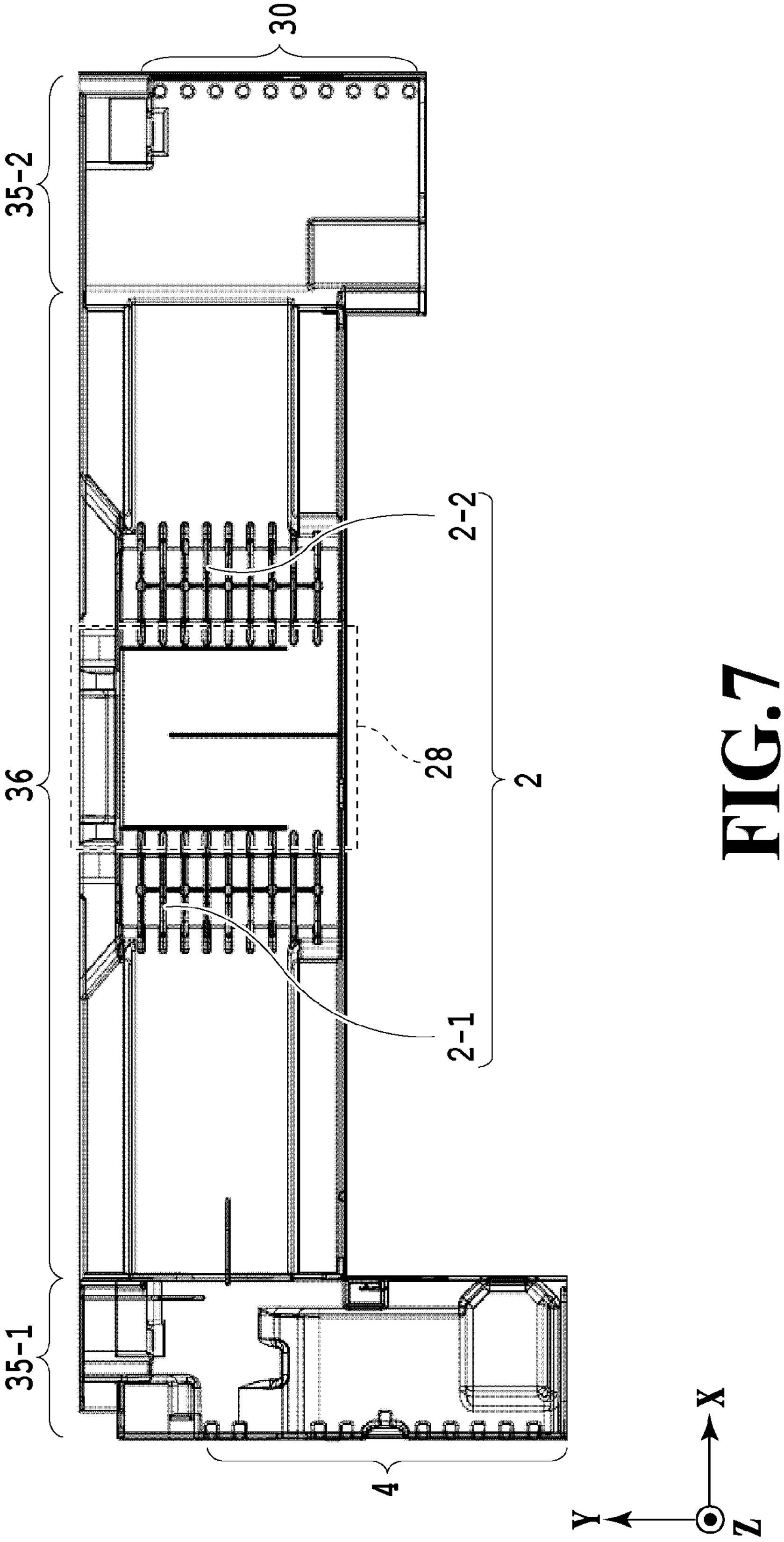
FIG. 7 is an enlarged diagram of a part of the air circulation flow path.

The shape of the air circulation flow path that is implemented by the access cover base 41 is explained by using FIG. 5A and FIG. 5B, FIG. 7, and FIG. 8A and FIG. 8B. As shown in FIG. 7 and the like, the air circulation flow path includes a main flow path 36 located at the center portion of the main body of the image printing apparatus 31, an intake flow path 35-1 that takes in air into the main flow path 36 from the away side, and an intake flow path 35-2 that takes in air into the main flow path 36 from the home side. As shown in these drawings, the intake flow path 35-1 and the intake flow path 35-2 are each a flow path for taking in air at a position one step lower than the main flow path 36. In the present specification, in a case where it is not necessary to distinguish between the intake flow path 35-1 and the intake flow path 35-2, they are simply represented as an intake flow path 35. This also applies to other elements.

Figure 8A:
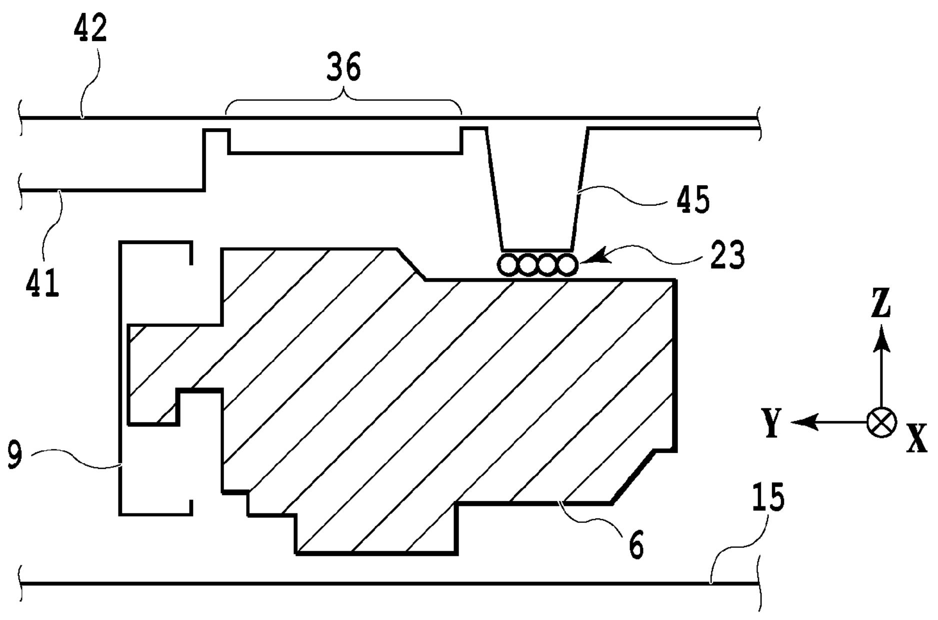
FIG. 8A and FIG. 8B are each a diagram for explaining the width of a main flow path.
Figure 8B:
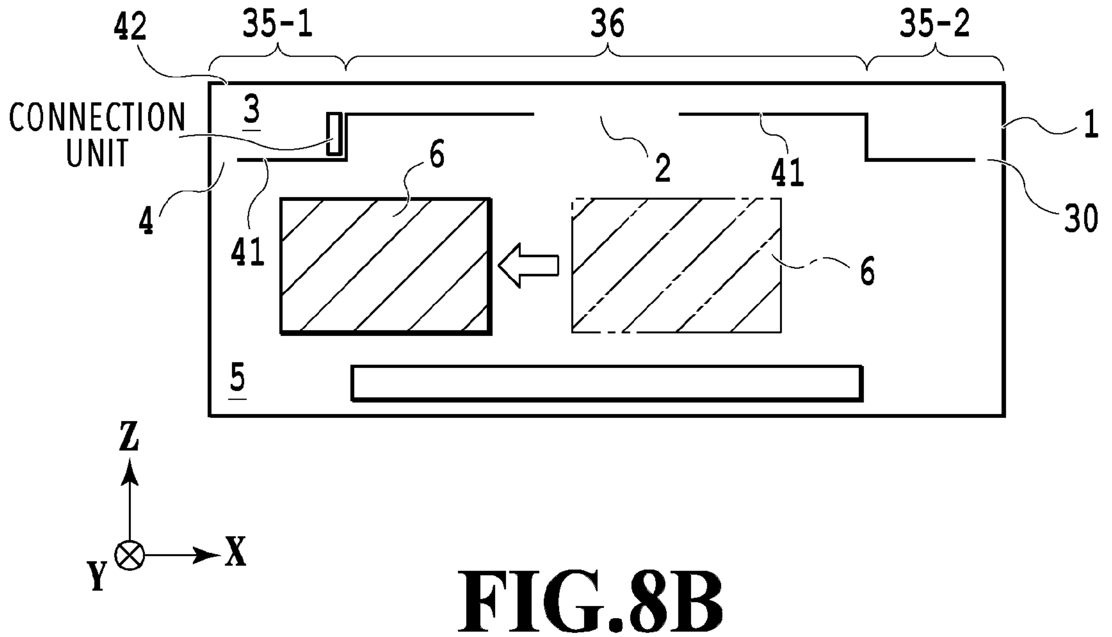

As shown in FIG. 8A, the width in the sub scanning direction of the main flow path 36 is equal to the length in the Y-direction between a tube press shape 45 for pressing the tube 23 and the chassis 9. Further, as shown in FIG. 8B, the width in the height direction of the main flow path 36 (width in the Z-direction, so-called "depth") is equal to a value obtained by subtracting the height of the connection unit for connecting the operation unit 26 and the control unit from the length in the Z-direction between the access cover base 41 and the access cover 42.

For the main flow path 36 and the intake flow path 35, a boundary on the side surface of the flow path is formed by a wall that rises in the Z-direction from the access cover base 41. In the present embodiment, as shown in FIG. 5B, the configuration is such that a plurality of support surfaces 44 provided at the upper end portion of the wall supports the access cover 42. With the configuration such as this, in a case where a heavy object is placed on the top surface of the access cover 42, it is possible to suppress the deformation of the access cover 42.

Figure 18:
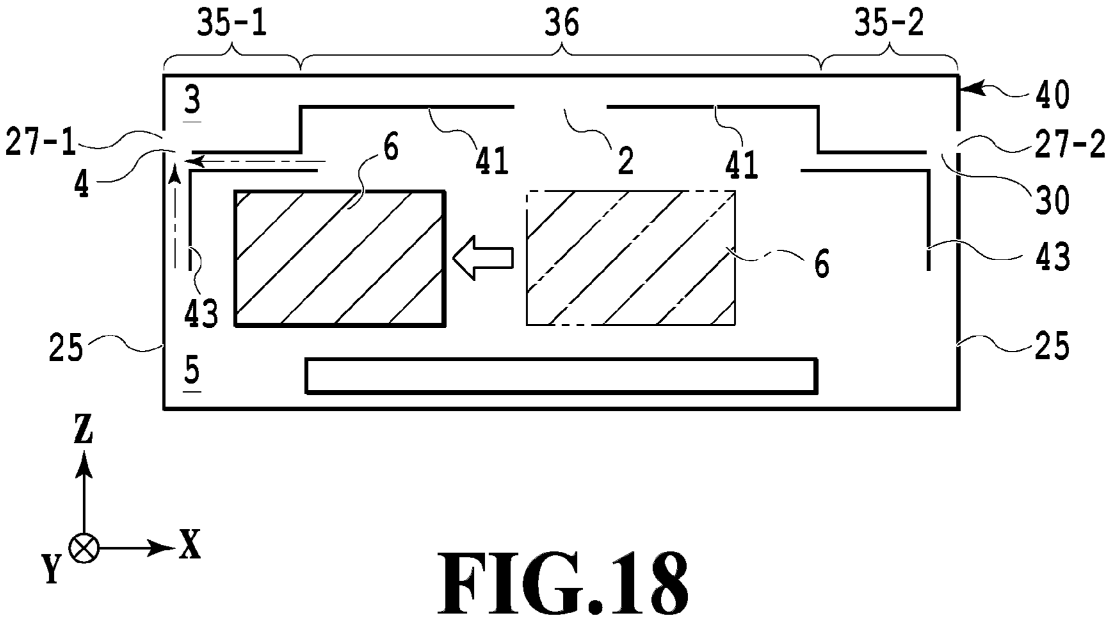
FIG. 18 is a diagram showing a flow of air that occurs by movement of the carriage.

As shown in FIG. 18, in the present embodiment, the access cover unit 40 is opened and closed at the time of maintenance, such as ink exchange and jam processing. The gap between a middle frame 43 and the side cover 25 and the gap between the middle frame 43 and the access cover base 41 are each a passing unit through which air passes.

Further, as shown in FIG. 18, in a case where the access cover unit 40 is opened, the outer casing is divided into a lower outer casing (referred to as first outer casing) and an upper outer casing (referred to as second outer casing). The first space 5 exists inside the first outer casing and the second space 3 exists inside the second outer casing.

As shown in FIG. 7, a second communication unit 4 and a third communication unit 30 are each constituted by providing a plurality of holes side by side, whose size does not allow a human finger to enter the hole, and the third communication unit 30 includes ten circular holes and the second communication unit 4 includes ten rectangular holes. By setting the size of each hole to a size that does not allow a human finger to enter the hole, it is possible to prevent a user from being injured in a case where the user inserts his/her finger into the hole.

As regards the hole group as the communication unit of the present embodiment, the number of holes and the shape of the hole are not limited. Further, the communication unit is not limited to a hole and a tube, a pipe or the like may be used. The portion at which the communication unit that causes the space (first space) on the side on which the carriage 6 exists and the space (second space) in which the carriage 6 does not exist to communicate with each other is arranged is called "connection unit".

Figure 9B:
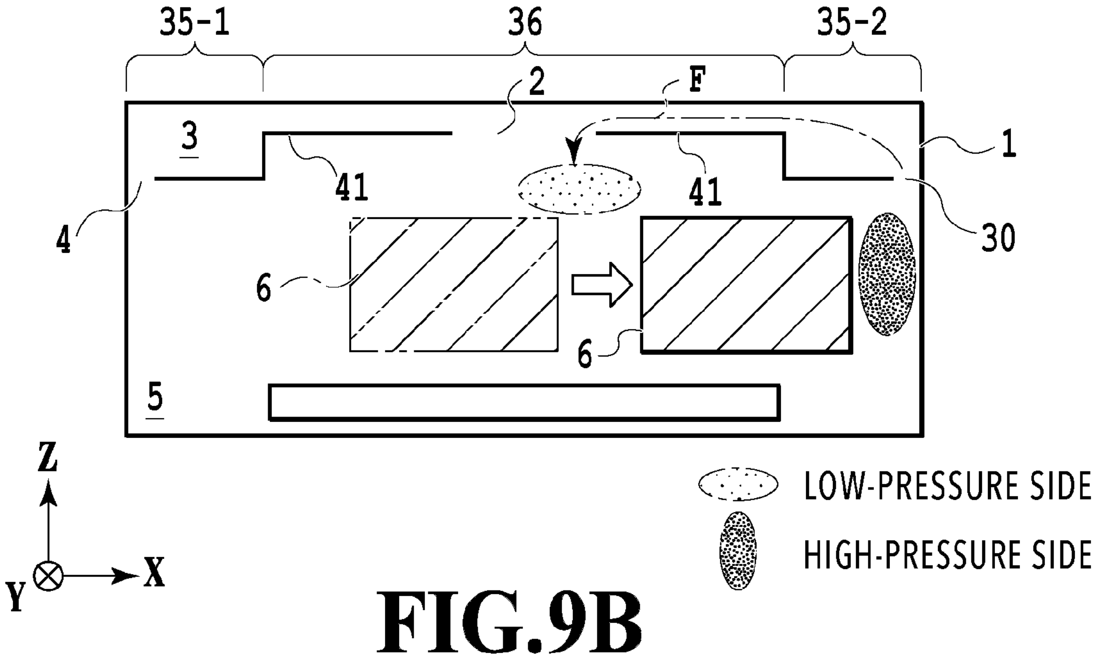

Next, a mechanism that causes an air flow to occur in the flow path is explained by using FIG. 9A, FIG. 9B, FIG. 11A, and FIG. 11B. FIG. 9A shows a case where the carriage 6 moves from the home side to the away side and FIG. 9B shows a case where the carriage 6 moves from the away side to the home side. As shown in FIG. 9A and FIG. 9B, in a case where the carriage 6 reciprocates, the pressure in the space in the front in the traveling direction of the carriage 6 becomes high, and on the other hand, the pressure in the space in the rear in the traveling direction becomes low. Consequently, as shown in FIG. 9A, the pressure of the portion in the vicinity of the second communication unit 4 provided in the intake flow path 35-1 installed in the front in the traveling direction of the carriage 6 becomes high compared to that of the portion in the vicinity of the first communication unit 2 provided at the center of the main flow path 36. Due to this, an air flow F that flows from the high-pressure side to the low-pressure side via the intake flow path 35-1 and the main flow path 36 is generated in the second space 3.

Figure 11A:
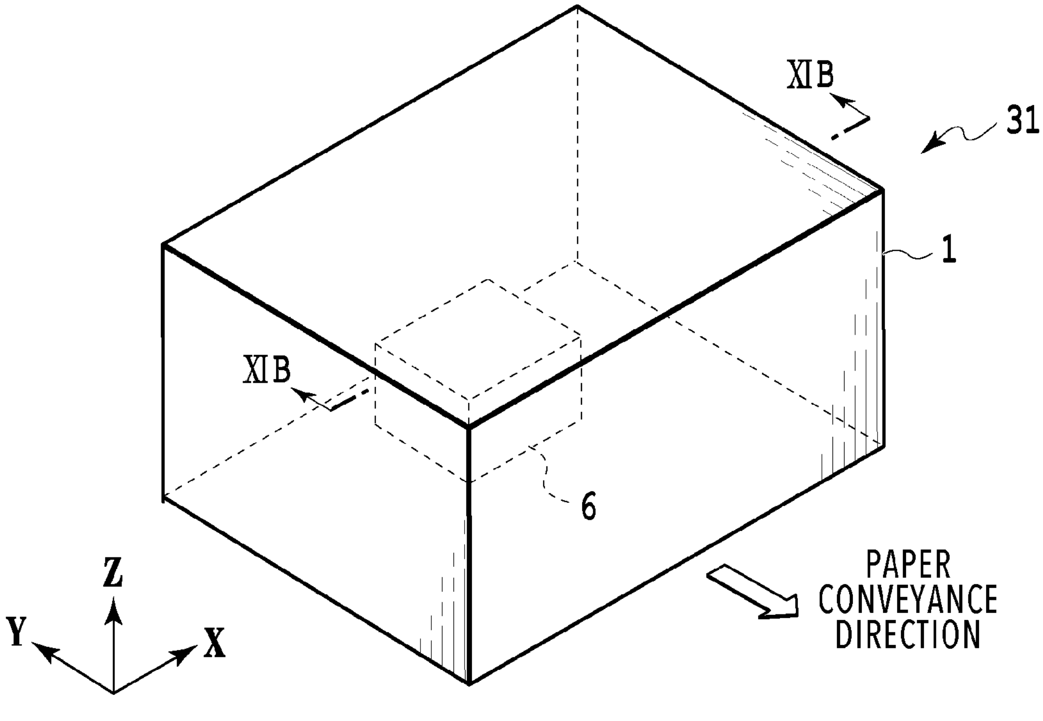
FIG. 11A and FIG. 11B are each a diagram for explaining a position relationship between a communication unit and a movement range of the carriage.
Figure 11B:
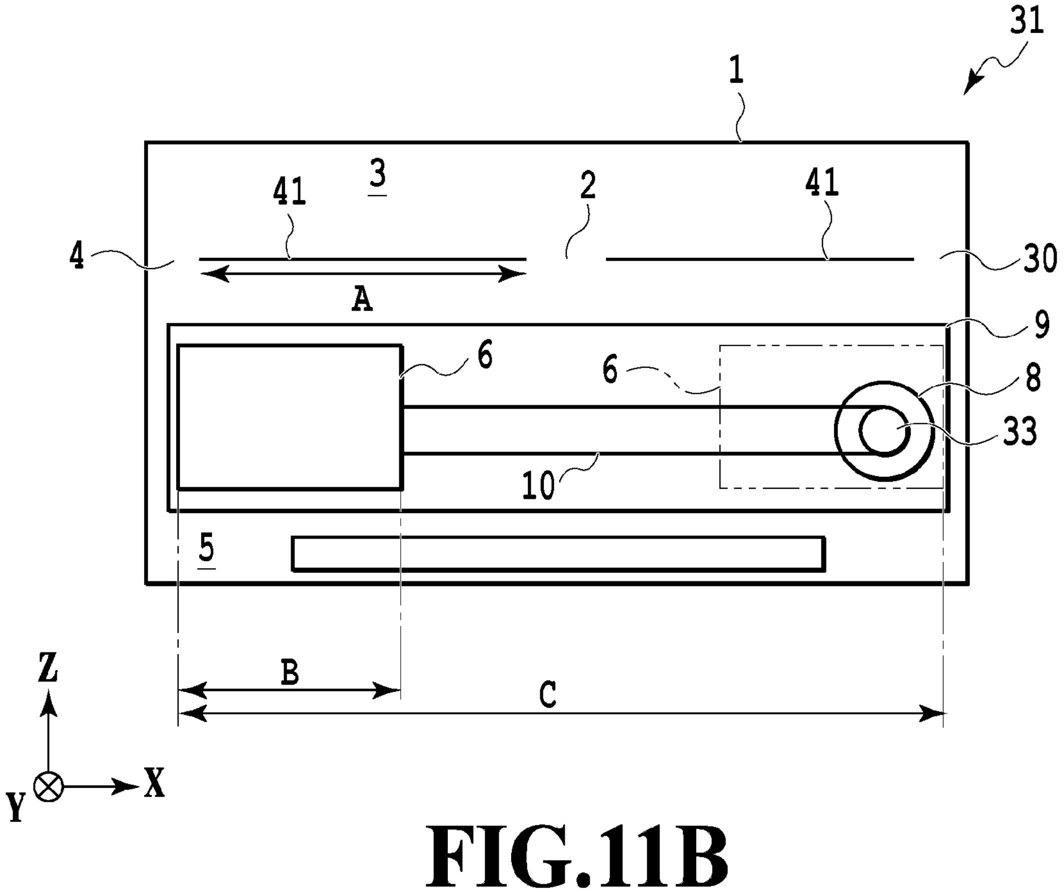

FIG. 11A is a schematic perspective diagram of the image printing apparatus 31 and FIG. 11B is a schematic projection diagram along a cross-sectional line XIb-XIb in FIG. 11A. As shown in FIG. 11B, it is preferable for a distance A between the first communication unit 2 and the second communication unit 4 to be greater than or equal to a width B (that is, A≥B) in the main scanning direction of the carriage 6. In a case where the design is made so that A≥B is satisfied, it is possible to secure the distance between the high-pressure side and the low-pressure side to a certain extent. Consequently, it is possible to effectively cause an air flow to occur in which air including ink mist flows from the high-pressure side to the low-pressure side through the second space located above.

Figure 15:
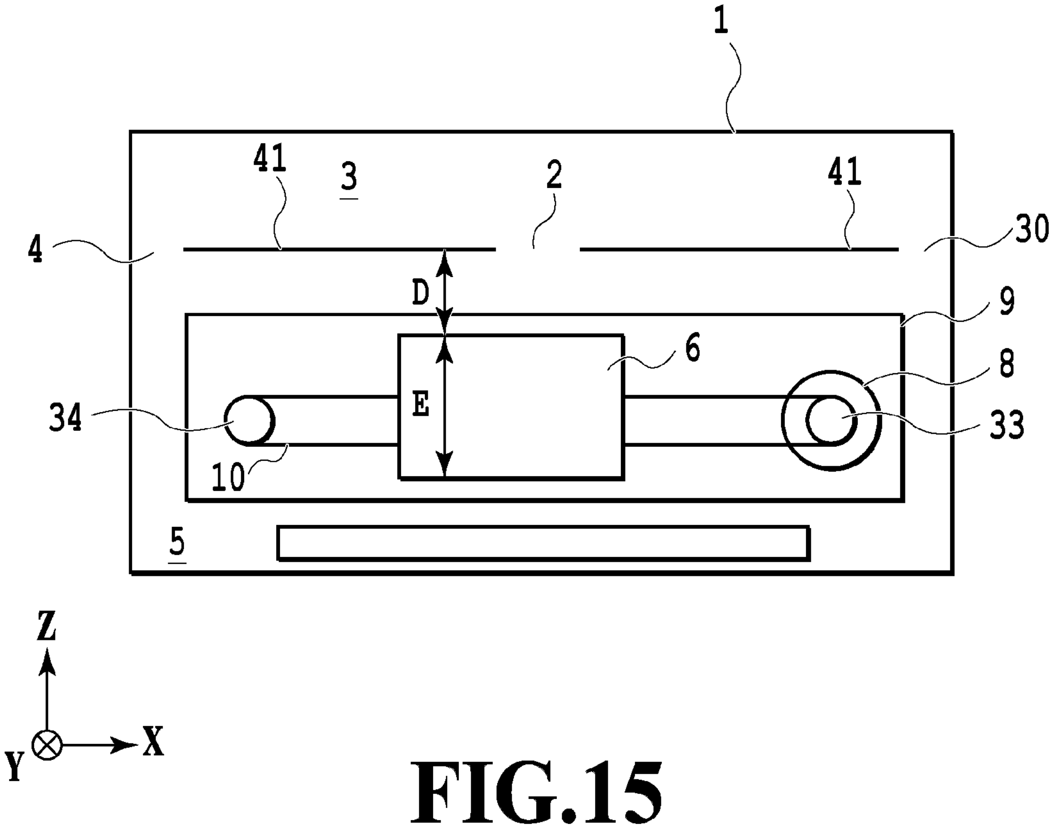
FIG. 15 is a diagram for explaining a position relationship between the wall of a flow path and the carriage.

It is preferable for the width in the sub scanning direction of the intake flow path 35 to be substantially equal to or greater than the maximum width in the Y-axis direction of the carriage 6. Further, as regards the wall surface position on the side of the printing unit 32 of the access cover base 41, as shown in FIG. 15, it is preferable for the interval between the access cover base 41 and the carriage 6 to be less than or equal to the width in the Z-axis direction of the carriage 6 (that is, E≥D).

Figure 19A:
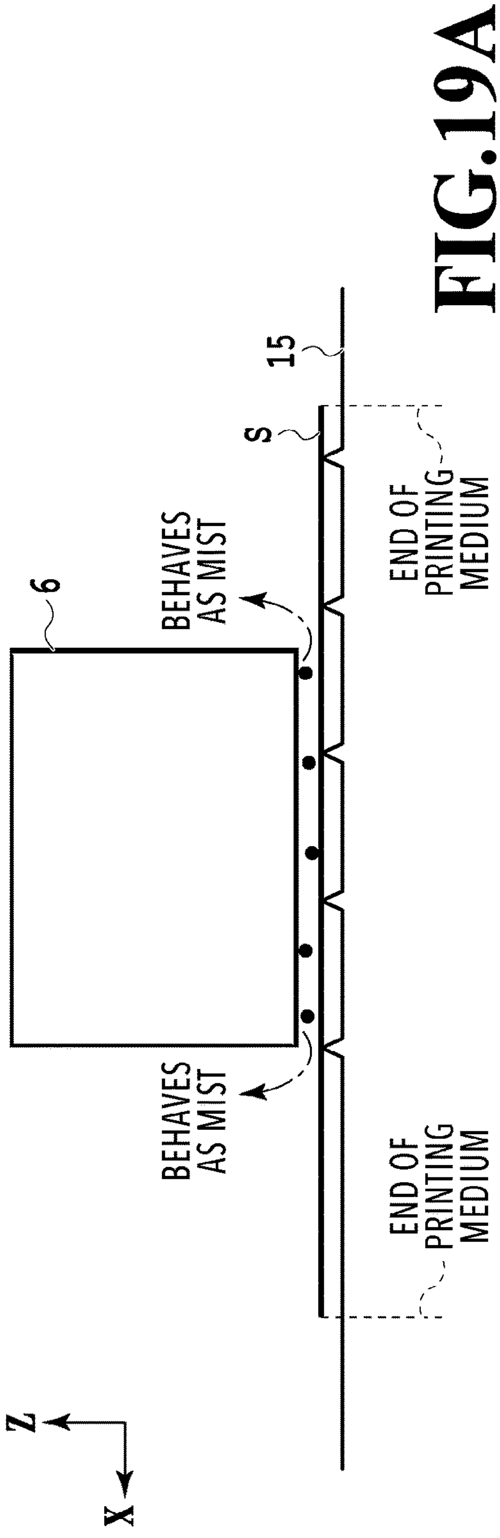
FIG. 19A and FIG. 19B are each a diagram for explaining the occurrence of high-density mist.
Figure 19B:
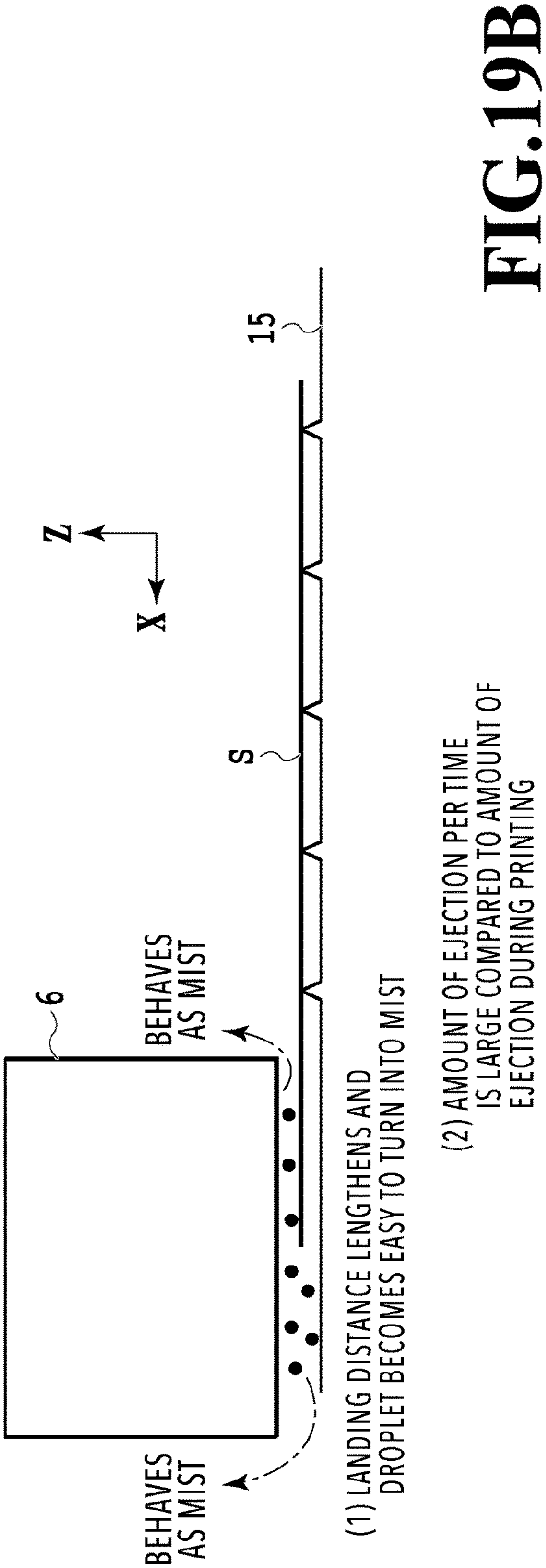

Here, the occurrence of ink mist is explained by using FIG. 19A and FIG. 19B. FIG. 19A shows the occurrence of ink mist while printing on the printing medium S and FIG. 19B shows the occurrence of ink mist in a case where preliminary ejection is performed at the end portion on the home side of the printing medium S. As shown in FIG. 19A and FIG. 19B, in a case where preliminary ejection is performed at the end portion of the printing medium S, the landing distance of ink droplets becomes long compared to that in a case where printing is performed at the center of the printing medium S, and therefore, ink droplets becomes easy to turn into mist. Because of this, high-density ink mist occurs and the ink mist density in the space in the vicinity of the carriage 6 on which the print head 13 having performed preliminary ejection is mounted becomes high.

Consequently, as shown in FIG. 9A or FIG. 9B, by providing the third communication unit 30 also on the home side, in addition to the second communication unit 4 on the away side, it is possible to effectively take in the high-density ink mist that has occurred due to the preliminary ejection into the flow path. Further, in an image printing apparatus in which a sensor exists outside the scan width of the carriage 6, by installing the second communication unit 4 or the third communication unit 30 outside the scan width, it is possible to efficiently take in the air including ink mist stagnant at the portion in the vicinity of the sensor into the flow path. Further, it is preferable to set each of the distance between the third communication unit 30 and the first communication unit 2 and the distance between the third communication unit 30 and the second communication unit 4 at this time to a distance greater than or equal to the width B in the main scanning direction of the carriage 6.

In order to cause a circulating air flow to occur within the flow path, it is also possible to perform control to cause the carriage 6 to reciprocate between one end portion and the other end portion of the movable area in a case where ink ejection is not performed.

In the present embodiment, as shown in FIG. 6 or FIG. 7, between a first opening 2-1 and a second opening 2-2 included in a first communication unit 2 provided in the main flow path 36, a collection mechanism 28 for collecting ink mist is provided. The collection mechanism 28 uses three ribs in order to implement collection of ink mist by precipitation due to the gravitational force by providing a long flow path and collection of ink mist by air including ink mist colliding with each other due to inertia.

It is sufficient for there to be at least one or more ribs and depending on the scanning speed of the carriage 6 or the particle diameter of the particle desired to be captured, it may also be possible to increase the number of ribs, change the arrangement of the ribs, and so on. Further, it may also be possible to user a filter as an ink mist capturing unit.

In a case where the carriage 6 reciprocates along the X-axis direction, a negative pressure occurs at the time of the carriage 6 passing under each opening of the first communication unit 2 and by being pulled by the negative pressure that has occurred, the air moves to and fro between the first opening 2-1 and the second opening 2-2.

Figure 12:
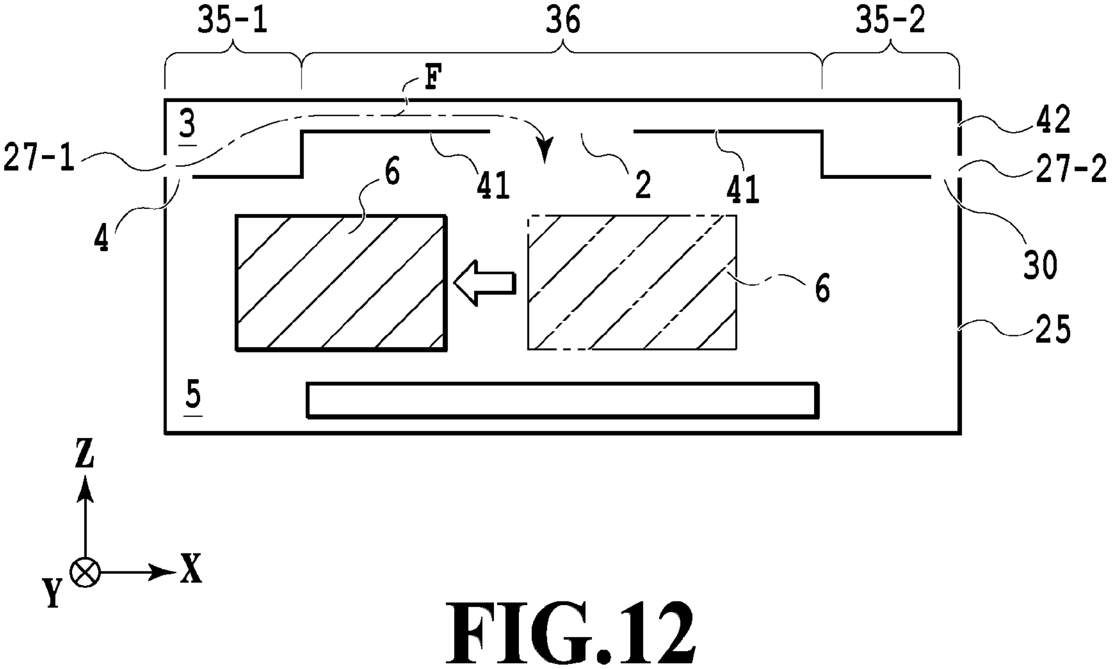
FIG. 12 is a diagram showing a flow of air that occurs by movement of the carriage in a case where there is an outside air communication unit.

As shown in FIG. 12, the second communication unit 4 provided in the intake flow path 35-1 that functions as a duct for conveying air is caused to communicate with an outside air communication unit 27-1, which is a gap between the rotatable access cover 42 and the side cover 25 under the access cover 42. Further, similarly, the third communication unit 30 provided in the intake flow path 35-2 is caused to communicate with an outside air communication unit 27-2, which is a gap between the rotatable access cover 42 and the side cover 25 under the access cover 42. By the pressure of the air behind the carriage 6 becoming lower than that of the air outside the apparatus at the time of the carriage 6 moving up to the end portion, an air flow in the direction shown by an arrow F occurs and it is possible to bring the air outside the apparatus, which does not include mist, into the apparatus. The access cover 42 functions as the second outer casing on the upper side described previously and the side cover 25 under the access cover 42 functions as the first outer casing on the lower side. The second outer casing has a rotation mechanism for rotating and a retaining mechanism for retaining the state where the access cover 42 is rotated by the rotation mechanism.

In the present embodiment, the outside air communication unit is provided so as to be located between the first outer casing and the second outer casing, but the outside air communication unit may be provided at any position in the first outer casing or in the second outer casing as long as it is possible to take in the outside air into the air circulation flow path at that position.

Figure 13A:
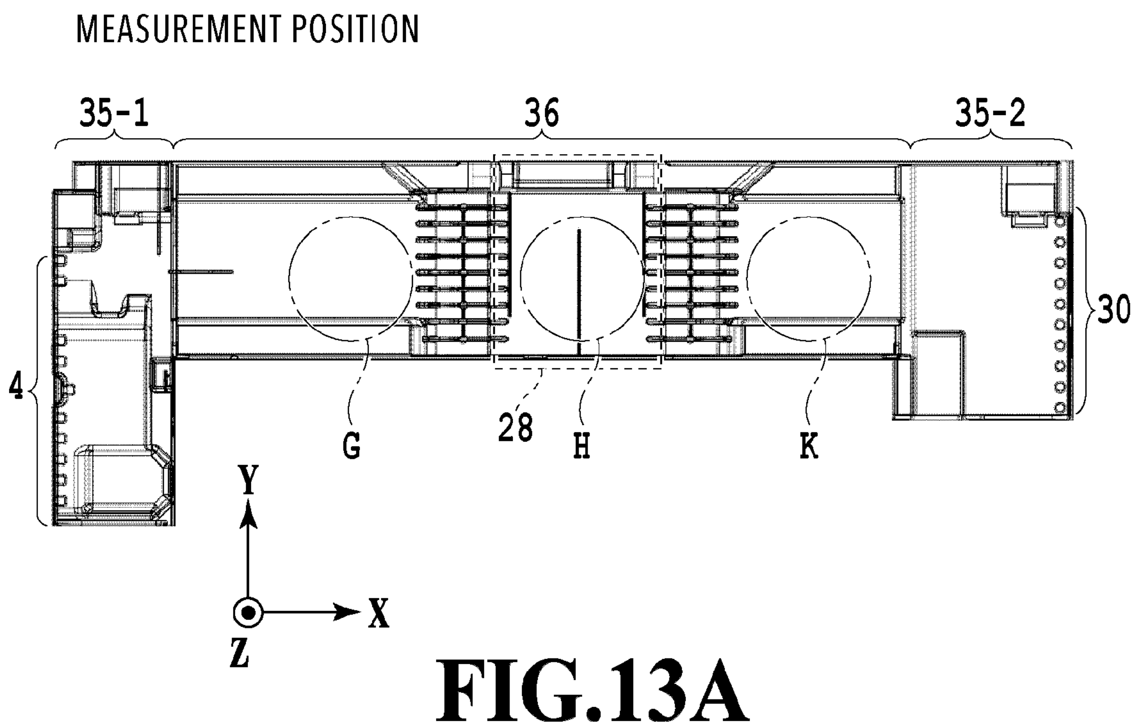
FIG. 13A and FIG. 13B are diagrams for explaining measurement results of the volume of each area of ink mist that flows in the main flow path.
Figure 13B:
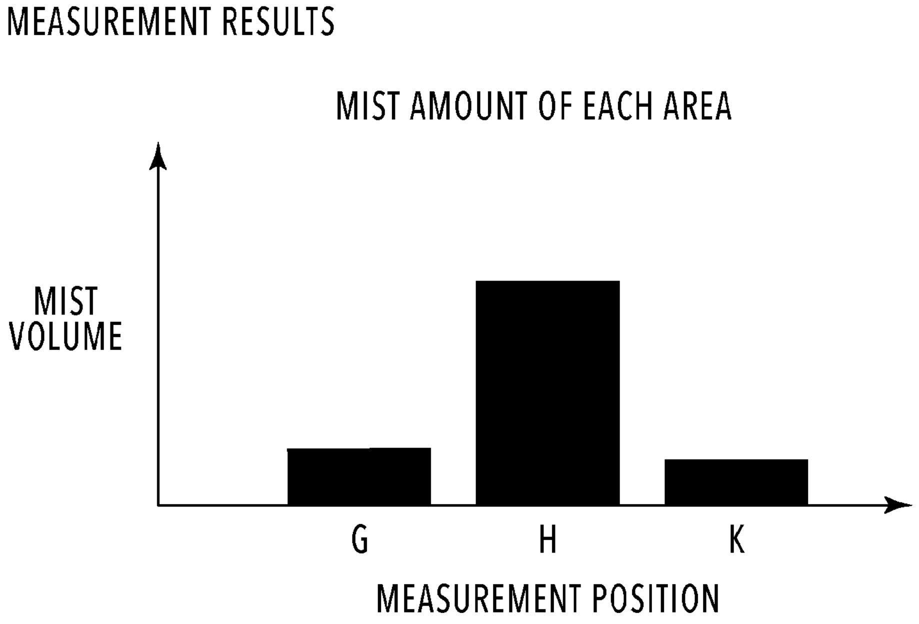

FIG. 13A and FIG. 13B are diagrams showing measurement results of the volume of the ink mist of each area, which flows in the main flow path 36. In detail, FIG. 13A is a diagram showing the positions of measurement areas G, H, and K at which measurement is performed and as shown in FIG. 13A, the positions of the measurement areas G, H, and K are different in the main scanning direction. Further, FIG. 13B is a graph indicating the volume of the ink mist floating within the main flow path 36 during printing in each area shown in FIG. 13A.

For the measurement of the amount of ink mist, the APS (Aerodynamic Particle Sizer) measurement device is used. In the outer casings above the intake flow path 35 and the main flow path 36, holes were bored and by using the APS measurement device, the amount of ink mist that passes through each of the measurement areas G, H, and K was measured. FIG. 13B shows the measurement results. As shown in FIG. 13B, it can be seen that into the measurement areas G and K, the air outside the apparatus flows, which does not include mist, and therefore, the amount of ink mist is small, but on the other hand, in the measurement area H, the air containing much ink mist moves to and fro, and therefore, the amount of ink mist is large.

Effects of the Present Embodiment

According to the present embodiment, it is made possible to implement capturing and collection of ink mist without the need to provide a fan for causing a circulating flow of air to occur between the first space 5 and the second space 3.

Second Embodiment

In the following, the second embodiment is explained. In the following, explanation relating to the same contents as those of the first embodiment described previously is omitted as appropriate and contents different from those of the first embodiment are explained.

In the first embodiment, the position of the second space 3 configuring the air circulation flow path is above the printing unit 32 (see FIG. 9A and the like). In contrast to this, in the present embodiment, the second space 3 is provided at a portion other than the portion above the printing unit 32.

Figure 14:
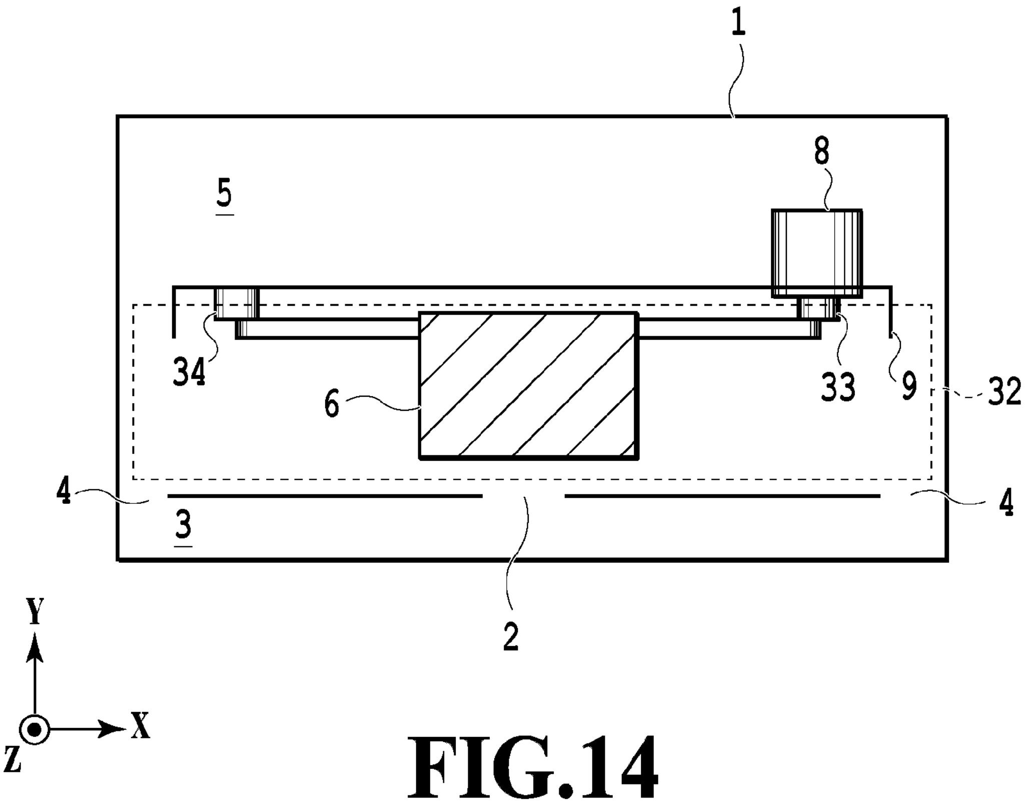
FIG. 14 is a diagram showing a position relationship between a first space on the side on which the carriage exists and a second space on the side on which the carriage does not exist in an image printing apparatus according to a second embodiment.

FIG. 14 is a schematic diagram showing a position relationship between the first space 5 on the side on which the carriage 6 exists and the second space 3 on the side on which the carriage 6 does not exist in a case where the image printing apparatus 31 according to the present embodiment is viewed from above. As shown schematically, in the present embodiment, inside the outer casing 1, the second space 3 exists on the front side on which the front cover 24, the operation unit 26 and the like are provided relative to the first space 5 in which the carriage 6 is arranged. Further, in the present embodiment, the partitioning member that partitions the first space 5 and the second space 3 from each other extends in the main scanning direction and in the height direction.

In the configuration in FIG. 14, the second space 3 exists at the position a distance apart in the −Y-direction from the printing unit 32 being taken as the base point. According to this configuration, as in the first embodiment, the effect is obtained that air flows from the high-pressure side space in the front in the traveling direction of the carriage 6 toward the low-pressure space in the rear in the traveling direction. The merit obtained by arranging the second space 3 for implementing an air flow path on the front side of the main body of the image printing apparatus 31 is that the exchange of parts constituting the collection mechanism 28 of ink mist is made easy.

In the example described previously, the second space 3 for implementing the air circulation flow path exists on the front side of the main body of the image printing apparatus 31. However, in accordance with the position at which the space within the apparatus is open, the second space 3 for implementing the air circulation flow path may exist behind (on the side in the +Y-direction of, on the rear side of) the space in which the carriage 6 moves or below (on the side in the −Z-direction of) the space.

Third Embodiment

In the following, the third embodiment is explained. In the first embodiment, the second communication unit 4 is installed on the end portion of the main body of the image printing apparatus 31, which is outside the movement range of the carriage 6 in the main scanning direction (see FIG. 9A and the like). In contrast to this, in the present embodiment, the second communication unit 4 is provided on the side closer to the center of the main body, which is within the movement range of the carriage 6, not on the end portion of the main body.

Figure 17:
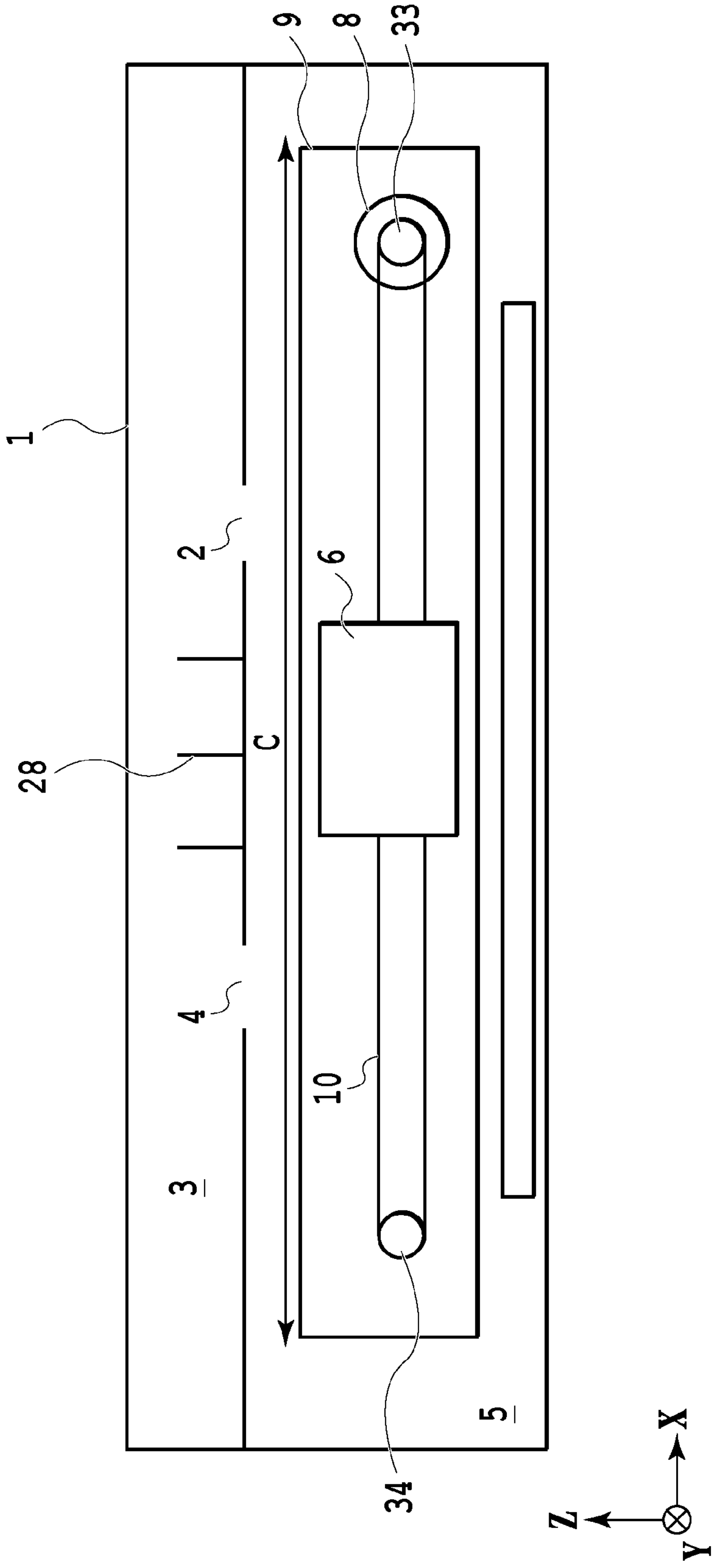
FIG. 17 is a schematic cross-sectional diagram showing a structure of a printing apparatus according to a third embodiment.

In the present embodiment, as shown in FIG. 17, within a movement range C in the main scanning direction of the carriage 6, at least the one first communication unit 2 and at least the one second communication unit 4 exist, respectively, and in the second space 3 therebetween, the collection mechanism 28 for collecting ink mist is provided. It may be possible to provide a plurality of the first communication units 2 and a plurality of the second communication units 4, respectively, but it is preferable to set the distance between the first communication unit 2 and the second communication unit 4 at least to the width in the main scanning direction of the carriage 6 or more.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-022110, filed Feb. 16, 2022, which is hereby incorporated by reference herein in its entirety.

What is claimed is:

1. A printing apparatus comprising:

a casing;

a conveyance unit configured to convey a printing medium in a first direction;

a carriage on which a print head that ejects a liquid is mounted and which is configured to reciprocate within a predetermined range in a second direction intersecting with the first direction;

a partition member arranged above the carriage and configured to partition an inside of the casing in a height direction intersecting with the first direction and the second direction into a first space in which the carriage reciprocates and a second space arranged above the first space and the carriage;

a first communication unit provided within the predetermined range in the second direction and configured to cause the first space and the second space to communicate with each other; and a second communication unit provided outside the first communication unit in the second direction and configured to cause the first space and the second space to communicate with each other.

2. The printing apparatus according to claim 1, wherein an interval in the height direction between the partition member and the carriage is less than or equal to a length in the height direction of the carriage.

3. The printing apparatus according to claim 1, wherein the second space is located on a downstream side of the first space in the first direction.

4. The printing apparatus according to claim 1, wherein a distance between the first communication unit and the second communication unit is greater than or equal to a length of the carriage in the second direction.

5. The printing apparatus according to claim 4, wherein the second communication unit is provided outside the predetermined range in the second direction.

6. The printing apparatus according to claim 4, wherein the second communication unit is provided within the predetermined range in the second direction.

7. The printing apparatus according to claim 1, wherein at least one of the first communication unit and the second communication unit includes a plurality of holes.

8. The printing apparatus according to claim 1, further comprising:

an air communication unit that communicates with the outside.

9. The printing apparatus according to claim 8, wherein the casing includes a first casing and a second casing above the first casing, wherein the first space is located inside the first casing, and wherein the second space is located inside the second casing.

10. The printing apparatus according to claim 9, wherein the air communication unit is provided between the first casing and the second casing.

11. The printing apparatus according to claim 10, wherein the second casing has a rotation mechanism for rotating and a retaining mechanism for retaining a state of being rotated by the rotation mechanism.

12. The printing apparatus according to claim 1, wherein the first communication unit overlaps the second communication unit in the first direction.

13. A printing apparatus comprising:

a casing;

a conveyance unit configured to convey a printing medium in a first direction;

a carriage on which a print head that ejects a liquid is mounted and which is configured to reciprocate within a predetermined range in a second direction intersecting with the first direction;

a partition member configured to partition an inside of the casing in a height direction intersecting with the first direction and the second direction into a first space in which the carriage reciprocates and a second space in which the carriage does not reciprocate;

a first communication unit provided within the predetermined range in the second direction and configured to cause the first space and the second space to communicate with each other;

a second communication unit provided outside the first communication unit in the second direction and configured to cause the first space and the second space to communicate with each other; and a third communication unit provided in the partition member, wherein the third communication unit is provided at a position at which the third communication unit overlaps the first communication unit in the first direction, and wherein the first communication unit is provided at a position closer to a center of the predetermined range than the third communication unit.

14. The printing apparatus according to claim 13, wherein the third communication unit is apart from each of the first communication unit and the second communication unit at a distance greater than or equal to a length of the carriage in the second direction.

15. The printing apparatus according to claim 13, further comprising:

a maintenance unit provided at a first end portion in the second direction and configured to perform maintenance processing of the print head, wherein the second communication unit is provided closer to the maintenance unit than the third communication unit in the second direction.

16. The printing apparatus according to claim 15, wherein the print head performs preliminary ejection to eject a liquid that does not contribute to a printing operation at the first end portion.

17. A printing apparatus comprising:

a casing;

a conveyance unit configured to convey a printing medium in a first direction;

a carriage on which a print head that ejects a liquid is mounted and which is configured to reciprocate within a predetermined range in a second direction intersecting with the first direction;

a partition member configured to partition an inside of the casing in a height direction intersecting with the first direction and the second direction into a first space in which the carriage reciprocates and a second space in which the carriage does not reciprocate;

a first communication unit provided within the predetermined range in the second direction and configured to cause the first space and the second space to communicate with each other;

a second communication unit provided outside the first communication unit in the second direction and configured to cause the first space and the second space to communicate with each other; and a capturing unit provided in the second space and configured to capture mist, wherein the first communication unit has a first opening and a second opening and the capturing unit is provided between the first opening and the second opening.

18. The printing apparatus according to claim 17, wherein the capturing unit includes at least one or more ribs.

* * * * *